US 11,565,634 B2

(12) United States Patent
Yamaguchi et al.

(10) Patent No.: US 11,565,634 B2
(45) Date of Patent: Jan. 31, 2023

(54) DOOR WIRING MODULE (71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Makoto Higashikozono, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 93 days.

(21) Appl. No.: 17/296,391

(22) PCT Filed: Nov. 6, 2019

(86) PCT No.: PCT/JP2019/043400
§ 371 (c)(1),
(2) Date: May 24, 2021

(87) PCT Pub. No.: WO2020/110631
PCT Pub. Date: Jun. 4, 2020

(65) Prior Publication Data
US 2022/0017026 A1    Jan. 20, 2022

(30) Foreign Application Priority Data
Nov. 26, 2018  (JP) .............................. JP2018-220722

(51) Int. Cl.
*B60R 16/02* (2006.01)
*H02G 3/04* (2006.01)
(Continued)

(52) U.S. Cl.
CPC ....... *B60R 16/0215* (2013.01); *H01B 7/0823* (2013.01); *H02G 3/04* (2013.01); *H02G 3/36* (2013.01)

(58) Field of Classification Search
CPC ............ B60R 16/0215; B60R 16/0207; H01B 7/0823; H01B 7/0846; H02G 3/04; H02G 3/36; H02G 3/30; H02G 3/305
See application file for complete search history.

(56) References Cited

U.S. PATENT DOCUMENTS 6,033,745 A     3/2000  Yamaguchi et al.
2014/0305697 A1  10/2014  Hudson et al.
(Continued)

FOREIGN PATENT DOCUMENTS

JP    05-046608    6/1993
JP    09-076837    3/1997
(Continued)

OTHER PUBLICATIONS

International Search Report issued in International Patent Application No. PCT/JP2019/043400, dated Dec. 24, 2019, along with an English translation thereof.
(Continued)

*Primary Examiner* — Paresh Paghadal
(74) *Attorney, Agent, or Firm* — Greenblum & Bernstein, P.L.C.

(57) ABSTRACT

A door wiring module includes: a door functional planar member; a wiring member wired on and held by the door functional planar member; and an exterior member in which a part of the wiring member extending to an outer side from the door functional planar member and incorporated into the door is wired and held. The door wiring module is provided to be able to be folded so that the exterior member overlaps with the door functional planar member before being incor- (Continued)

porated into the door, and is incorporated into the door in a state where the exterior member is developed.

2 Claims, 8 Drawing Sheets

(51) Int. Cl.
  *H01B 7/08* (2006.01)
  *H02G 3/36* (2006.01)

(56) References Cited

U.S. PATENT DOCUMENTS

2015/0321625 A1* 11/2015 Sato ............... B60R 16/0215
                                                     174/72 A
2020/0062198 A1   2/2020 Mizushita et al.

FOREIGN PATENT DOCUMENTS

| JP | 10-181466 | 7/1998 | | |
|----|-----------|--------|---|---|
| JP | 2008-149871 | 7/2008 | | |
| JP | 2014-054179 | 3/2014 | | |
| JP | 2015-067072 | 4/2015 | | |
| JP | 2016-210338 | 12/2016 | | |
| WO | WO-2016098658 A1 * | 6/2016 | ............ | B32B 27/00 |
| WO | 2018/207695 | 11/2018 | | |

OTHER PUBLICATIONS

International Preliminary Report on Patentability (IPRP) issued in International Patent Application No. PCT/JP2019/043400, dated May 27, 2021, along with an English translation thereof.
Japan Office Action issued in Japan Patent Application No. 2018-220722, dated Feb. 8, 2022, together with English translation thereof.

* cited by examiner

DOOR WIRING MODULE

TECHNICAL FIELD

The present disclosure relates to a door wiring module.

BACKGROUND ART

Patent Document 1 discloses a technique of locating an attaching piece passing through and holding a door harness on part of a weather strip attached to an outer peripheral edge of a door to be integral with the weather strip.

PRIOR ART DOCUMENTS

Patent Documents

Patent Document 1: Japanese Patent Application Laid-Open No, 9-76837

SUMMARY

Problem to be Solved by the Invention

However, according to the technique disclosed in Patent Document 1, the weather strip is a waterproof member which is made up of an elastic material and has an elongated narrow band-like shape, thus a shape of the door harness is not maintained constant depending on the weather strip and is hardly assembled to the door.

Accordingly, an object is to provide a technique capable of improving assemblability of a door wiring module.

Means to Solve the Problem

A door wiring module according to the present disclosure includes: a door functional planar member incorporated between a door panel and a design trim in a door of a vehicle; a wiring member wired on and held by the door functional planar member; and an exterior member in which a part of the wiring member extending to an outer side from the door functional planar member and incorporated into the door is wired and held, wherein the door wiring module is provided to be able to be folded so that the exterior member overlaps with the door functional planar member before being incorporated into the door, and the door wiring module is incorporated into the door in a state where the exterior member is developed.

Effects of the Invention

According to the present disclosure, assemblability of the door wiring module can be improved.

DESCRIPTION OF EMBODIMENT(S)

Description of Embodiment of Present Disclosure

Embodiments of the present disclosure are listed and described firstly.

A door wiring module according to the present disclosure is as follows.

(1) A door wiring module according to the present disclosure includes: a door functional planar member incorporated between a door panel and a design trim in a door of a vehicle; a wiring member wired on and held by the door functional planar member; and an exterior member in which a part of the wiring member extending to an outer side from the door functional planar member and incorporated into the door is wired and held, wherein the door wiring module is provided to be able to be folded so that the exterior member overlaps with the door functional planar member before being incorporated into the door, and the door wiring module is incorporated into the door in a state where the exterior member is developed. The door functional planar member is incorporated into the door in the state where the door wiring module is folded so that the exterior member overlaps with the door functional planar member, and subsequently, the exterior member is developed to be incorporated into the door, thus the door wiring module can be incorporated into the door. At this time, the door functional planar member is assembled and the exterior member is developed, thus the wiring member has a predetermined wiring state for the door. Accordingly, an erroneous combination of the door wiring module can be suppressed, for example, and a time required for an assembly operation can be reduced. Accordingly, assemblability of the door wiring module can be improved.

(2) The door functional planar member may have rigidity to be hardly beaded in a front-back direction. Accordingly, a spread shape of the door functional planar member can be maintained easily, and the door functional planar member can be incorporated into the door easily.

(3) It is applicable that the door functional planar member and the exterior member are provided at intervals in an extension direction of the wiring member, and the wiring member is bended between the door functional planar member and the exterior member, thus the door wiring module can be bended so that the exterior member overlaps with the door functional planar member. Accordingly, the door wiring module can be bended easily.

(4) The wiring member may include a plurality of covering wires wired side by side on a main surface of the door functional planar member and a main surface of the exterior member. Accordingly, the door wiring module can be thinned and thereby bended easily. Furthermore, a thickness of the door of the vehicle can reduced, and an interior space of the vehicle can be widened. The covering wire is used, thus cost can be reduced compared with a case where a flexible flat cable or a flexible print substrate, for example, is used.

(5) The exterior member may be a sheet member which fixes the plurality of covering wires by a contact area direct fixation to hold the plurality of covering wires to be located side by side. Accordingly, a member for fixing the covering wire and the exterior member can be omitted.

DETAILS OF EMBODIMENT OF PRESENT DISCLOSURE

Specific examples of a door wiring module of the present disclosure are described hereinafter with reference to the drawings. The present invention is not limited to these examples, but is indicated by claims, and it is intended that meanings equivalent to claims and all modifications within a scope of claims are included.

Embodiment

Figure 1:
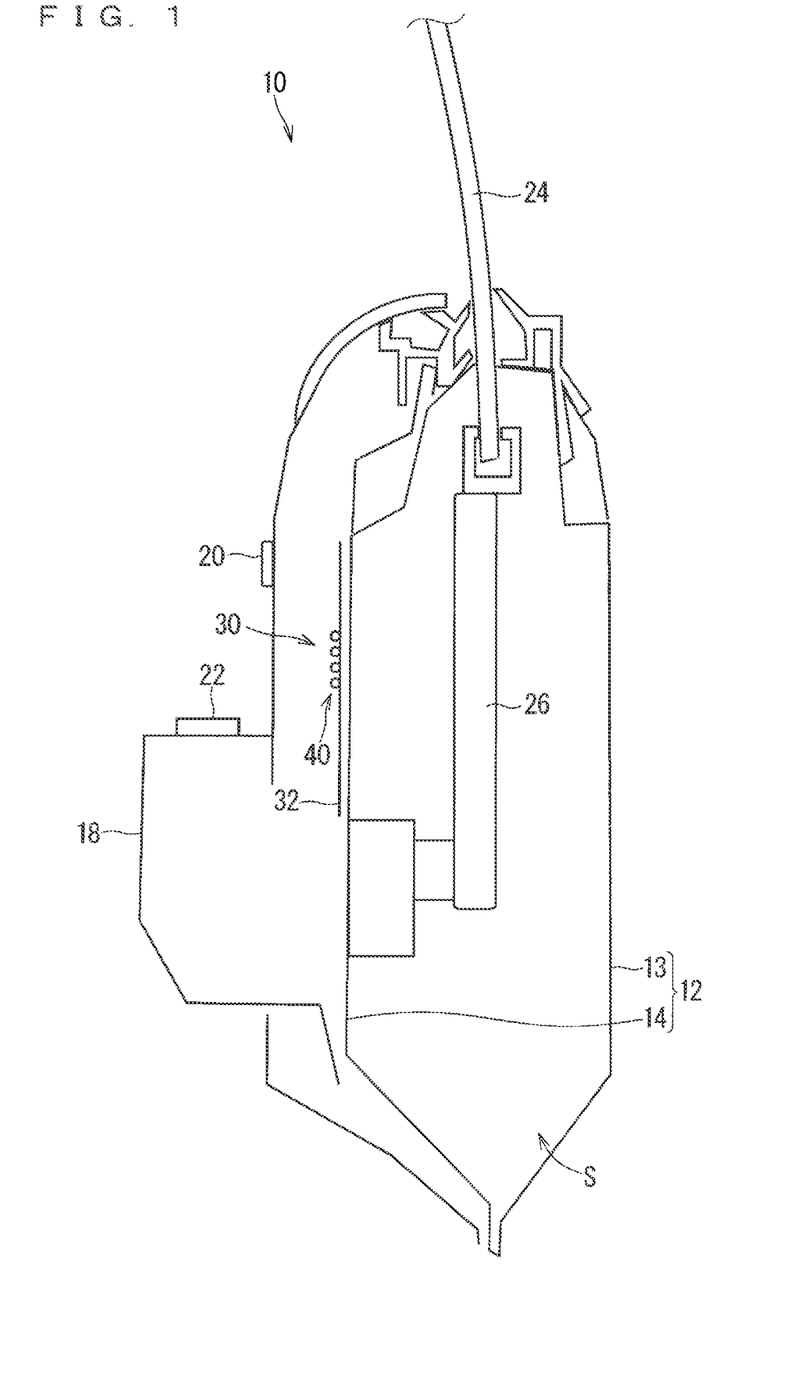
FIG. 1 is an explanation diagram illustrating a position where a door wiring module is assembled in a door.
Figure 2:
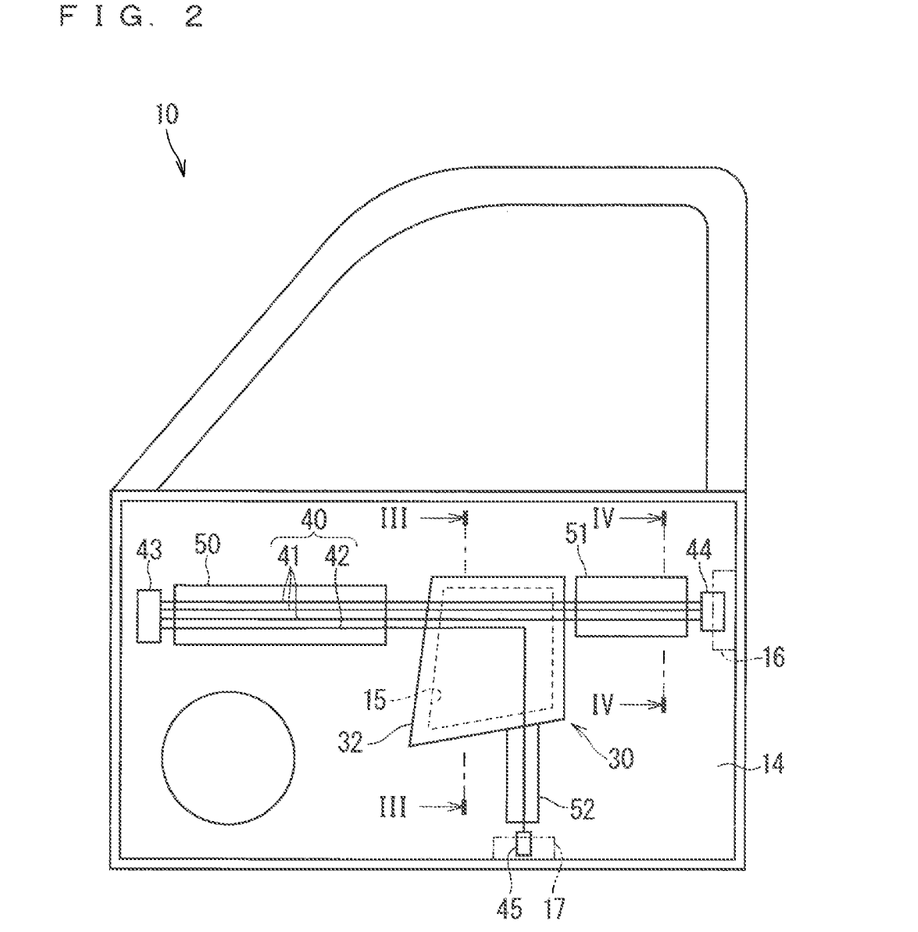
FIG. 2 is a schematic side view illustrating the door wiring module according to an embodiment and a door into which the door wiring module is incorporated.
Figure 3:
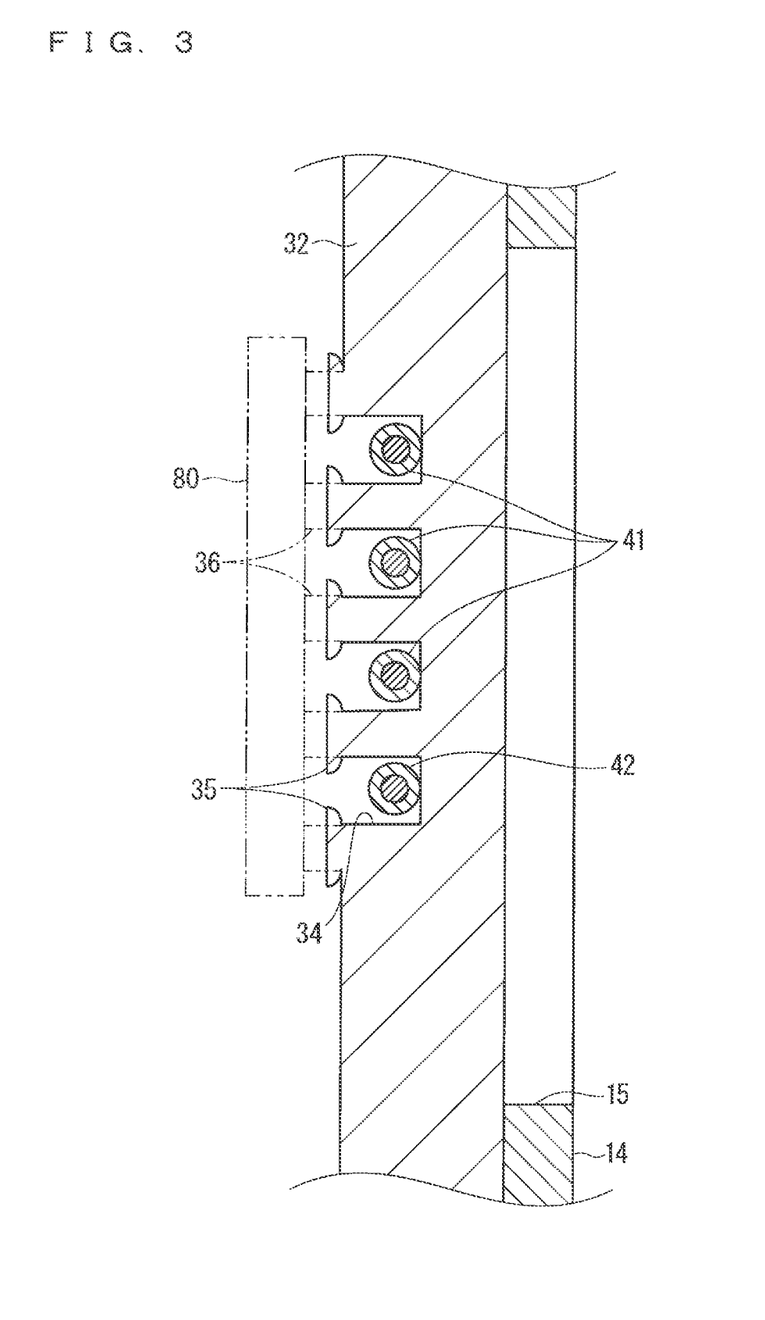
FIG. 3 is a schematic cross-sectional view of the door wiring module cut along a line III-III in FIG. 2.
Figure 4:
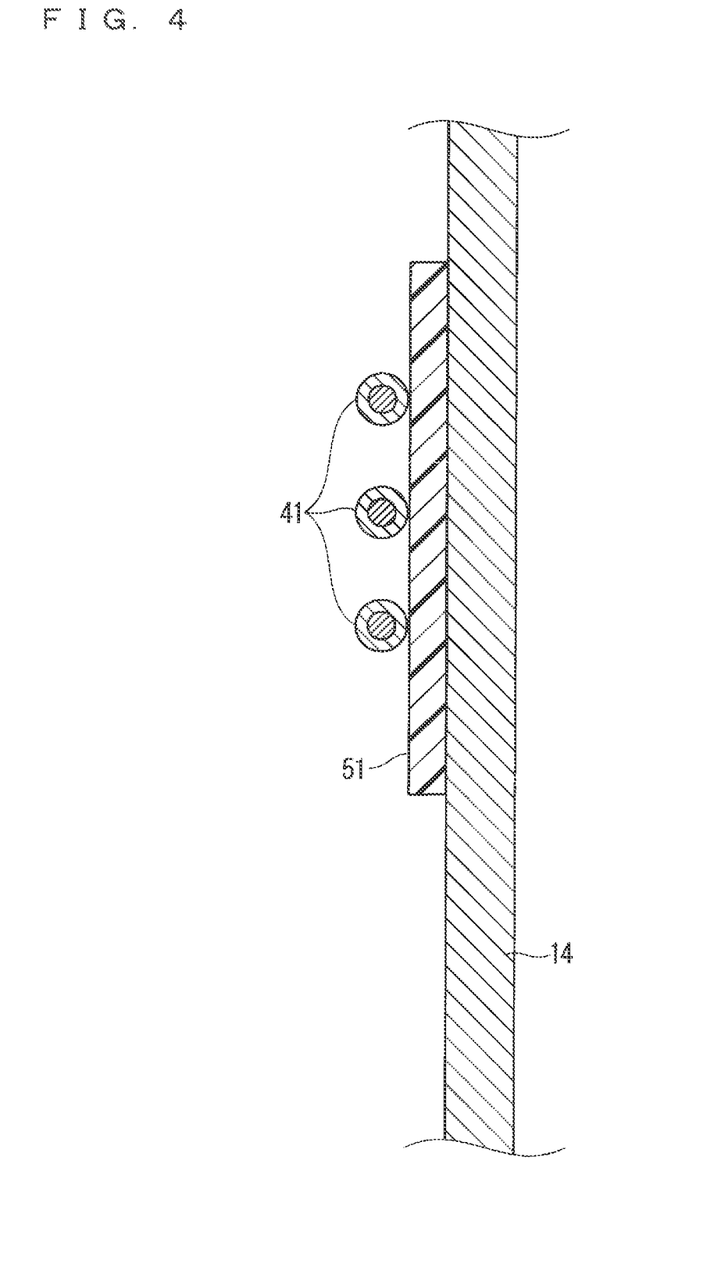
FIG. 4 is a schematic cross-sectional view of the door wiring module cut along a IV-IV line in FIG. 2.

A door wiring module according to an embodiment is described hereinafter. FIG. 1 is an explanation diagram illustrating a position where a door wiring module 30 is assembled in a door 10. FIG. 2 is a schematic side view illustrating the door wiring module 30 according to the embodiment and the door 10 into which the door wiring module 30 is incorporated, FIG. 2 is a drawing of the door 10 without a design trim 18 seen from an inner side of the vehicle. FIG. 3 is a schematic cross-sectional view of the door wiring module 30 and the door 10 cut along a III-III line in FIG. 2. FIG. 4 is a schematic cross-sectional View of the door wiring module 30 and the door 10 cut along an IV-IV line in FIG. 2.

The door 10 is formed into a flat shape as a whole, and is a part operable and closable to partition an inner side and outer side of a vehicle. The door 10 is assumed to be a driver side door, a passenger's side door, and a rear seat door, for example. The door 10 includes a door panel 12, a design trim 18, and the door wiring module 30.

The door panel 12 includes an outer panel 13 and an inner panel 14. The outer panel 13 is provided in a part of the door 10 facing the outer side of the vehicle to constitute an appearance of the vehicle together with a body part. The inner panel 14 is provided on a vehicle interior side of the outer panel 13. The inner panel 14 is provided with an opening 15.

The design trim 18 is a part provided in a part of the door 10 facing the inner side of the vehicle to constitute the interior of the vehicle. A door handle 20 and an operation part 22 of an in-vehicle apparatus, for example, are attached to the design trim 18.

The door wiring module 30 includes a door functional planar member 32, a wiring member 40, and exterior members 50, 51, and 52. The door wiring module 30 is assembled to the door panel 12, thereby being incorporated into the door 10, for example.

The door functional planar member 32 is a member incorporated between the door panel 12 and the design trim 18 in the door 10 of the vehicle. The wiring member 40 is fixed to the door functional planar member 32. The door functional planar member 32 is a planar member having a function for the door 10 in addition to the function of fixing the wiring member 40. The planar member herein indicates a member having a thickness dimension smaller than a dimension in a planar direction (two directions perpendicular to a thickness direction) and two-dimensionally spread. It needs not necessarily be perfectly flat in a front-back direction (the thickness direction), but a convex-concave portion may occur in the front-back direction.

In the description herein, the door functional planar member 32 is a member covering the opening 15 formed in the inner panel 14 in the door panel 12. The door functional planar member 32 is a flat component having an area substantially equal to or larger than the opening 15. The door functional planar member 32 is assembled to the opening 15 of the inner panel 14 to cover the opening 15. Accordingly, the door functional planar member 32 can partition the inner side and outer side of the vehicle. The door functional planar member 32 is attached to the opening 15 of the inner panel 14, and the attaching state is retained by a screwing structure or a locking structure, for example. For example, when a part of a peripheral part of the door functional planar member 32 overlapping with the inner panel 14 is screwed to the inner panel 14 using a screw, for example, a gap therebetween can be practicably covered.

A space S is formed between the outer panel 13 and the inner panel 14 and between the outer panel 13 and the door functional planar member 32 in a state where the door functional planar member 32 is assembled to the inner panel 14. A window 24 of the door 10 can be housed in this space S. The window 24 exposed to a rainwater environment is housed in the space 5, and a slit-like opening through which the window 24 goes in and out is formed on an upper side of the space S. Thus, the space S is a space which water may enter. The space S is a space which may be connected to an outer space, thus is also a space which a wind noise, for example, may enter from outside.

Thus, the door functional planar member 32 is provided as a member for completely partitioning a vehicle interior space and an outer space with the inner panel 14.

The door functional planar member 32 is a component in which resin or metal, for example, as a material is molded. The door functional planar member 32 may be molded by pouring a molten material into a mold or by performing a press molding on a planar material using a mold.

It is sufficient that the door functional planar member 32 has rigidity to be hardly bended in a front-back direction. Accordingly, when the door functional planar member 32 is assembled to the door panel 12, an edge part thereof is hardly bended, thus the door functional planar member 32 is easily kept in a spread shape, and can be easily assembled. For example, the door functional planar member 32 is formed to have higher rigidity than the exterior members 50, 51, and 52.

In the example illustrated in FIG. 1, only one opening 15 is formed in the inner panel 14, however, it is also considered that the plurality of openings 15 are formed in the inner panel 14. In this case, for example, one door function planar member 32 may be formed to be large enough to be able to cover the opening 15. Also applicable is a configuration that the plurality of door functional planar members 32 are provided to cover the plurality of openings 15, respectively.

A groove 34 in which the wiring member 40 is housed is formed on a main surface of the door functional planar member 32. The groove 34 is formed in accordance with a wiring state of the wiring member 40. The wiring member 40 is housed in and held by the groove 34, thereby being wired on and held by the door functional planar member 32.

Furthermore, the door functional planar member 32 needs not be flat in the front-back direction, however, a convex-concave shape may be formed in the front-back direction.

The wiring member 40 is an electrical wiring provided in the door 10 and connected to the electrical components 16 and 17 provided in the door 10. A part of the wiring member 40 along an extension direction is wired on and held by the door functional planar member 32. At least the other part of the wiring member 40 along an extension direction is wired on and held by the exterior members 50, 51, and 52. The wiring herein indicates that the wiring member 40 is wired in a form corresponding to a wiring state at a time of being assembled to the door 10. Accordingly, the door functional planar member 32 and the exterior members 50, 51, and 52 are assembled to a predetermined position of the door 10, thus wiring of the part of the wiring member 40 wired on and held by the door functional planar member 32 and the exterior members 50, 51, and 52 to the door 10 is completed.

Herein, a middle portion of the wiring member 40 along the extension direction is wired on and held by the door functional planar member 32. A plurality of end portions of the wiring member 40 along the extension direction are fixed the exterior members 50, 51, and 52, respectively.

Herein, a branch is formed in the wiring member 40. The branch part of the wiring member 40 is wired on and held by the door functional planar member 32. Accordingly, a branch shape of the branch part is maintained by the door functional planar member 32.

More specifically, the wiring member 40 includes a plurality of electrical wires 41 and 42. A covering wire having a core wire made up of a conductor with a covering around the core wire can be used as the electrical wires 41 and 42. The core wire may be a single core wire or a stranded wire. The plurality of electrical wires 41 and 42 are wired side by side on the door functional planar member 32. The plurality of electrical wires 41 and 42 are wired side by side on main surfaces of the exterior members 50, 51, and 52.

Herein, the plurality of electrical wires 41 and 42 include a first electrical wire 41 and a second electrical wire 42. In the example illustrated in FIG. 1, the wiring member 40 is made up of the three first electrical wires 41 and one second electrical wire 42, however, the number of the first electrical wires 41 and second electrical wires 42 is not limited thereto but is appropriately set in accordance with an apparatus to which they are connected, for example. The first electrical wire 41 and the second electrical wire 42 are collected in a parallel state on each one end side. A common connector 43 is attached to one end portions of the first electrical wire 41 and the second electrical wire 42. The common connector 43 is connected to a connector of a wiring member on a side of a vehicle body, for example. Accordingly, the electrical components 16 and 17 provided in the door 10 receive a power supply from a battery mounted to the vehicle body and supplies and receives a signal to and from an ECU or a gateway mounted to the vehicle body. In the example illustrated in FIG. 2, one end portions of the first electrical wire 41 and the second electrical wire 42 are housed in the door 10, but may also extend to an outer side of the door 10.

The first electrical wire 41 and the second electrical wire 42 branch off in middle portions in the extension direction. The branch part thereof is located on the door functional planar member 32. Connectors 44 and 45 are attached to the other end portions of the first electrical wiring 41 and the second electrical wiring 42, and are connected to the electrical components 16 and 17 via the connectors 44 and 45. The first electrical wire 41 is connected to the electrical component 16 incorporated into the back side of the door 10, for example, a door lock-unlock motor. For example, the second electrical wire 42 is connected to the electrical component 17 incorporated into a middle portion of the door 10 such as a motor driving a window open-close jig 26 for opening and closing a window 24 and various switches, for example.

The first electrical wire 41 and the second electrical wire 42 are held in the groove 34. Herein, the groove 34 is formed so that the number and a parallel state thereof correspond to the plurality of electrical wires 41 and 42. The plurality of electrical wires 41 and 42 are individually held in the plurality of grooves 34. However, the plurality of electrical wires 41 and 42 may be housed in one groove 34.

In the example illustrated in FIG. 3, the wiring member 40 is housed in the groove 34 formed in the door functional planar member 32 in a state of not coming out of the groove 34, thus the door functional planar member 32 and the wiring member 40 are fixed to each other. For example, in the example illustrated in FIG. 3, a retaining part 35 is formed on an upper portion of the groove 34 (a portion on a side opposite to a bottom portion of the groove 34) as a configuration of preventing the wiring member 40 from coming out of the groove 34. The retaining part 35 is formed by crushing a protruding part 36 protruding to an upper side of a sidewall portion of the groove 34 by a fusion head 80, for example. Needless to say, the configuration of preventing the wiring member 40 from coming out of the groove 34 is not limited thereto, however, adoptable are various configurations such as a configuration that a member different from the door functional planar member 32 presses an upper portion of the groove 34 or a configuration of providing an adhesive agent in the groove 34, for example.

The retaining part 35 may cover the whole groove 34 along the extension direction of the wiring member 40. The retaining part 35 may cover a part of the groove 34 along the extension direction of the wiring member 40. In this case, it is sufficient that the plurality of retaining parts 35 are provided at intervals along the extension direction of the wiring member 40.

A part of the wiring member 40 extending to the outer side from the door functional planar member 32 and incorporated into the door 10 is wired on and held by the exterior members 50, 51, and 52. In the example illustrated in FIG. 2, the exterior members 50, 51, and 52 are formed to be housed in the door 10, however, this configuration is not necessary. As described above, when the end portion of the wiring member 40 has the part extending to the outer side of the door 10 such as a part extending to a portion between the door 10 and the vehicle body, the exterior member may also have a part extending to the outer side of the door 10 such as a part extending to a portion between the door 10 and the vehicle body.

Specifically, the three exterior members 50, 51, and 52 are provided herein. A part of the collected first electrical wire 41 and second electrical wire 42 (a part before branching off) closer to the one end portions in relation to a part held by the door functional planar member 32 is wired on and held by the exterior member 50. A part of the first electrical wire 41 after the first electrical wire 42 and the second electrical wire 42 branch off closer to the other end portion in relation to a part held by the door functional planar member 32 is wired on and held by the exterior member 51. A part of the second electrical wire 42 after the first electrical wire 41 and the second electrical wire 42 branch off closer to the other end portion in relation to a part held by the door functional planar member 32 is wired on and held by the exterior member 52.

The exterior members 50, 51, and 52 are band-like members corresponding to a wiring route of the wiring member 40. Herein, the wiring member 40 is wired in a straight form on the exterior members 50, 51, and 52, and the exterior members 50, 51, and 52 are also formed in a straight form. However, the wiring member 40 may have a part bended and wired on the exterior members 50, 51, and 52. In this case, the exterior members 50, 51, and 52 may also be formed to have bended portions.

The wiring member 40 may branch off on the exterior members 50, 51, and 52. That is to say, the exterior members 50, 51, and 52 may hold the shape of the branch part.

It is sufficient that the exterior members 50, 51, and 52 disposed in operation positions, for example, hold the wiring member 40 in a state of being planarly positioned. Herein, the exterior members 50, 51, and 52 are sheet members holding the plurality of covering wires 41 and 42 to be located side by side. The exterior members 50, 51, and 52 may be flexible sheet members which can be bended easily. The exterior members 50, 51, and 52 may be sheet members each having rigidity with a degree of being able to be bended and hold the wiring member 40 in a state of being planarly positioned, or may be sheet members each having rigidity with a degree of being able to keep itself in a flat state and hold the wiring member 40 in a state of being two-dimensionally positioned. Each of the exterior members 50, 51, and 52 may have a three-dimensional shaped part such as a part made up of a wall partially standing on the exterior members 50, 51, and 52.

A material constituting the exterior members 50, 51, and 52 is not particularly limited, however, each of the exterior members 50, 51, and 52 is formed of a material containing resin of polyvinyl chloride (PVC), polyethylene terephthalate (PET), or polypropylene (PP), for example. Each of the exterior members 50, 51, and 52 may be a sheet-like material with an inner portion evenly filled or a non-woven sheet, a woven cloth, or a knitted cloth, for example. The exterior members 50, 51, and 52 may contain a material such as metal. The exterior members 50, 51, and 52 preferably has flexibility of easily bending in a front-back direction. The exterior members 50, 51, and 52 may be made up of a single layer or a plurality of stacked layers. When the exterior members 50, 51, and 52 are made up of the plurality of stacked layers, it is considered that a resin layer and a resin layer are stacked, for example. It is also considered that a resin layer and a metal layer are stacked, for example.

Herein, the plurality of covering wires 41 and 42 are fixed to the sheet-like exterior members 50, 51, and 52. Applicable as the above fixing state are a contact area fixation and a non-contact area fixation, or both fixations may be used together. Herein, the contact area fixation indicates that a portion where the electrical wires 41 and 42 and the exterior members 50, 51, and 52 have contact with each other is stuck and fixed. The non-contact area fixation indicates the fixing state which is not the contact area fixation. For example, a sewing thread, the other sheet material, or an adhesive tape presses the electrical wires 41 and 42 toward the exterior members 50, 51, and 52, or a sewing thread, the other sheet material, or an adhesive tape surrounds the electrical wires 41 and 42 and the exterior members 50, 51, and 52, thereby holding the electrical wires 41 and 42 and the exterior members 50, 51, and 52 to keep the electrical wires 41 and 42 and the exterior members 50, 51, and 52 fixed to each other. In the description hereinafter, the electrical wires 41 and 42 and the exterior members 50, 51, and 52 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the electrical wires 41 and 42 and the exterior members 50, 51, and 52 are indirectly stuck and fixed via an intervening member such as an adhesive agent, a gluing agent, and a double-sided adhesive tape provided therebetween. The contact area direct fixation indicates that the electrical wires 41 and 42 and the exterior members 50, 51, and 52 are directly stuck and fixed without an intervention of the adhesive agent, for example, which is separately provided. Considered in the contact area direct fixation is that resin included in at least one of the electrical wires 41 and 42 and the exterior members 50, 51, and 52 is melted, thus the electrical wires 41 and 42 and the exterior members 50, 51, and 52 are stuck and fixed, for example. In the description hereinafter, the electrical wires 41 and 42 and the exterior members 50, 51, and 52 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wires 41 and 42 and the exterior members 50, 51, and 52 are in the state of the contact area direct fixation by these means. Specifically, when the state of the contact area direct fixation is formed by the ultrasonic welding, for example, the electrical wires 41 and 42 and the exterior members 50, 51, and 52 are in the state of the contact area direct fixation by the ultrasonic welding. A portion where the state of the contact area direct fixation by the heat is formed by the welding (a fixing portion between the electrical wires 41 and 42 and the exterior members 50, 51, and 52) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

The exterior members 50, 51, and 52 may be or may not be fixed to the inner panel 14. When the exterior members 50, 51, and 52 are fixed to the inner panel 14, a fixing state thereof is not particularly limited, however, the fixing state described in the fixation of the door functional planar member 32 and the inner panel 14, for example, can be appropriately applied. When the exterior members 50, 51, and 52 are not fixed to the inner panel 14, the connector 43, 44, and 45 are connected to the other side member, thus a part of the door wiring module 30 where the exterior members 50, 51, and 52 are provided is held in the wiring state of the exterior member 50, 51, and 52.

Figure 5:
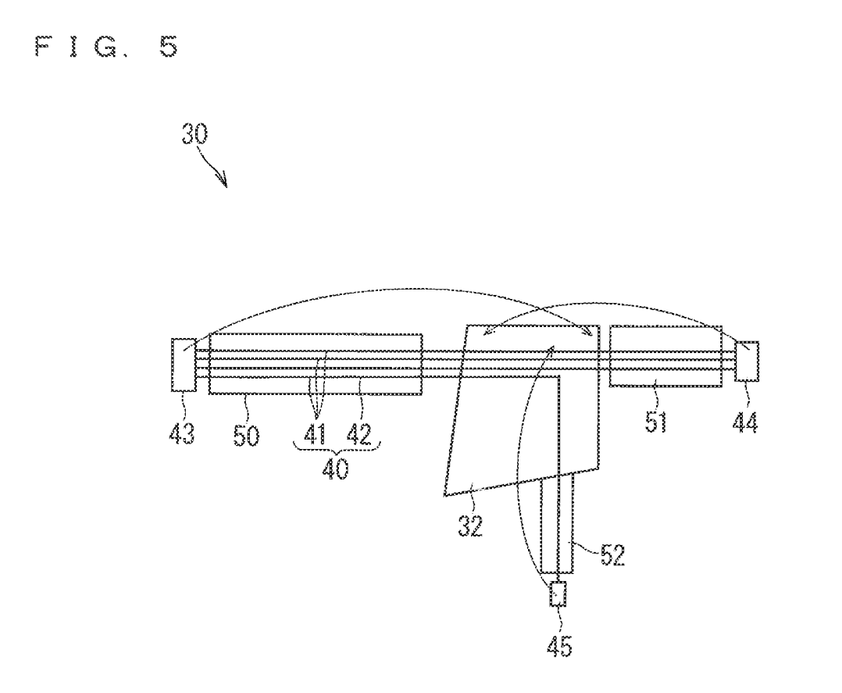
FIG. 5 is an explanation diagram illustrating a state where the door wiring module is folded.
Figure 6:
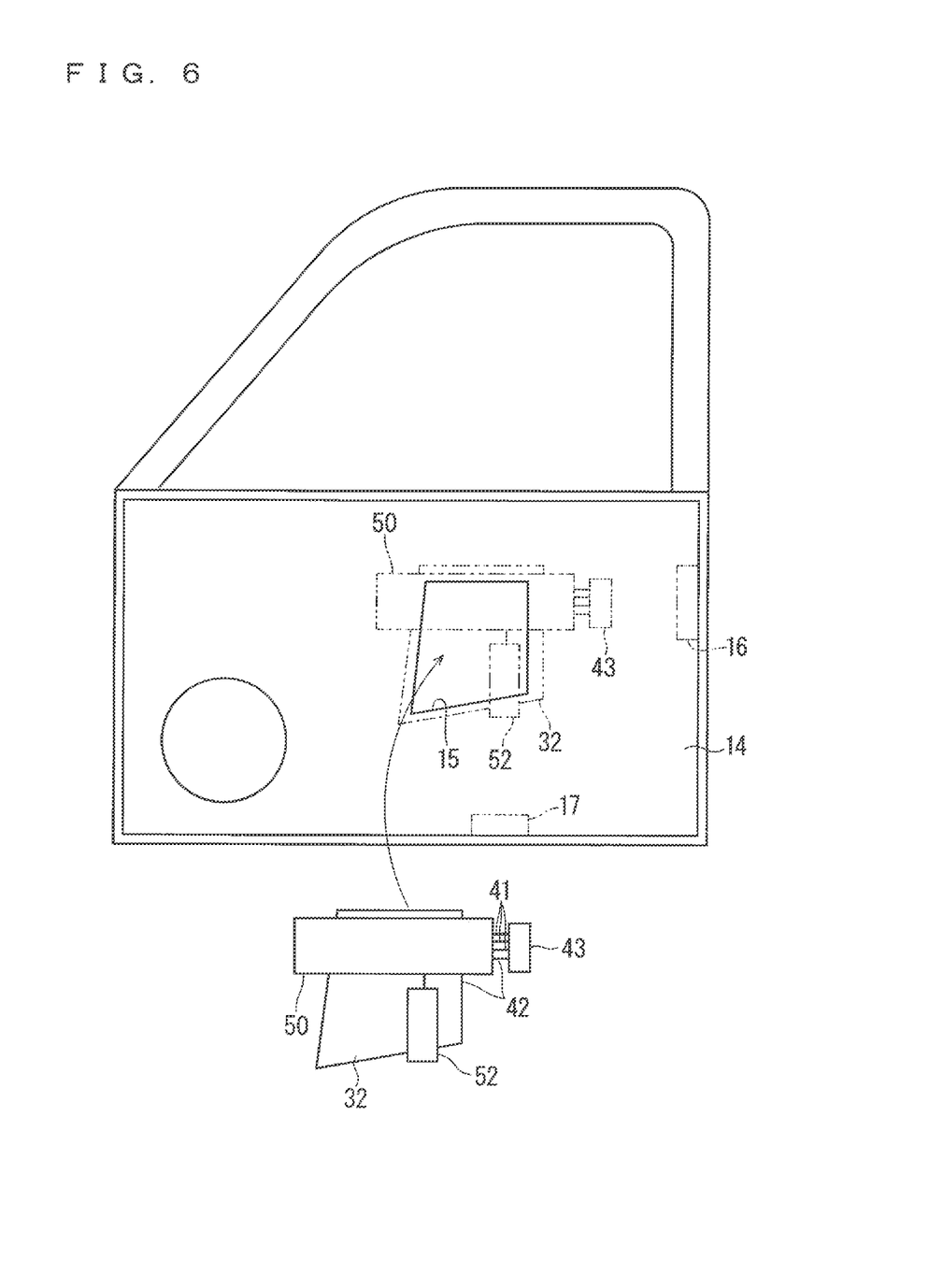
FIG. 6 is an explanation diagram illustrating a state where the folded door wiring module is assembled.

FIG. 5 is an explanation diagram illustrating a state There the door wiring module 30 is folded. FIG. 6 is an explanation diagram illustrating a state where the folded door wiring module 30 is assembled.

As illustrated in FIG. 5, the door wiring module 30 is provided to be able to be folded so that the exterior members 50, 51, and 52 overlap with the door functional planar member 32 before being incorporated into the door 10. Herein, the wiring member 40 is bended between the door functional planar member 32 and the exterior members 50, 51, and 52, thus the door wiring module 30 can be bended so that the exterior members 50, 51, and 52 overlap with the door functional planar member 32. It is obvious that the wiring member 40 may be bended together with the exterior members 50, 51, and 52 at portions of the exterior members 50, 51, and 52.

At this time, it is sufficient that a fixing part such as a screw part for fixation to the door panel 12 is not hidden by the exterior members 50, 51, and 52 but is exposed in the door functional planar member 32 in a state where the door wiring module 30 is folded. That is to say, it is sufficient that the door wiring module 30 is formed to be able to be folded so that the fixing part for fixation to the door panel 12 in the door functional planar member 32 is exposed in the folded state. Accordingly, the door functional planar member 32 is assembled to the door panel 12 easily in the state where the door wiring module 30 is folded.

The door wiring module 30 is manufactured in a developed state, and then folded, for example. In the door wiring module 30, the folded state is a packing state, for example. That is to say, the door wiring module 30 is transported from a manufacturing plant to an assembly plant in the folded state. Accordingly, the packing state of door wiring module 30 is compactible.

Then, as illustrated in FIG. 6, the door wiring module 30 is incorporated into the door 10 in the assembly plant. For example, the door functional planar member 32 is firstly assembled to the inner panel 14 of the door panel 12 in the state where the door wiring module 30 is folded. At this time, when the door functional planar member 32 is a member having high rigidity, the door functional planar member 32 is hardly bended and bowed at the time of assembling the door functional planar member 32, thus can be assembled easily. The door functional planar member 32 is relatively smaller than the inner panel 14, thus the door functional planar member 32 is assembled easily also in this point. As described above, the door functional planar member 32 is fixed to the door panel 12 using a screw, for example. Accordingly, a part of the wiring member 40 wired on the door functional planar member 32 has a predetermined wiring state for the door 10, and is maintained in this state.

After the door functional planar member 32 is assembled to the inner panel 14, the exterior members 50, 51, and 52 are developed. For example, the connectors 43, 44, and 45 are grasped and moved, and the exterior members 50, 51, and 52 are developed. Accordingly, the part of the wiring member 40 wired on the exterior members 50, 51, and 52 has a predetermined wiring state for the door 10. Subsequently, the connectors 43, 44, and 45 are connected to the connectors 43, 44, and 45 on the other side, and the exterior members 50, 51, and 52 are fixed to the door panel 12, thus the part wired on the exterior members 50, 51, and 52 is maintained in a predetermined wiring state for the door 10, and the door wiring module 30 is incorporated into the door 10. Accordingly, in the state where the door wiring module 30 is incorporated into the door 10, the exterior members 50, 51, and 52 are developed.

According to the door wiring module 30 having the above configuration, the door functional planar member 32 is incorporated into the door 10 in the state where the door wiring module 30 are folded so that the exterior members 50, 51, and 52 overlap with the door functional planar member 32, and subsequently, the exterior members 50, 51, and 52 are developed to be incorporated into the door 10, thus the door wiring module 30 can be incorporated into the door 10. At this time, the door functional planar member 32 is assembled and the exterior members 50, 51, and 52 are developed, thus the wiring member 40 has a predetermined wiring state for the door 10. Accordingly, an erroneous combination of the door wiring module 30 can be suppressed, for example, and a time required for an assembly operation can be reduced. Accordingly, assemblability of the door wiring module 30 can be improved. In the door wiring module 30, the door functional planar member 32 assembled first can be made smaller than the inner panel 14, the assemblability of the door wiring module 30 can be improved also in this point.

The door functional planar member 32 has rigidity to be hardly bended in the front-back direction. Accordingly, a spread shape of the door functional planar member 32 can be maintained easily, and the door functional planar member 32 can be assembled to the door 10 easily.

The wiring member 40 is bended between the door functional planar member 32 and the exterior members 50, 51, and 52, thus the door wiring module 30 can be beaded so that the exterior members 50, 51, and 52 overlap with the door functional planar member 32. Accordingly, the door wiring module 30 can be bended easily.

The wiring member 40 includes the plurality of covering wires 41 and 42 wired side by side on the main surface of the door functional planar member 32 and the main surfaces of the exterior members 50, 51, and 52, thus the door wiring module 30 can be thinned and bended easily. Furthermore, the thickness of the door 10 of the vehicle can reduced, and an interior space of the vehicle can be widened. The covering wires 41 and 42 are used, thus cost can be reduced compared with a case where a flexible flat cable or a flexible print substrate, for example, is used.

The exterior members 50, 51, and 52 are sheet members each fixing the plurality of covering wires 41 and 42 by the contact area direct fixation to hold the plurality of covering wires 41 and 42 to be located side by side. Thus, a member for fixing the covering wires 41 and 42 and the exterior members 50, 51, and 52 can be omitted.

[Modification example] In the description of the embodiment, the wiring member 40 is housed in and held by the groove 34 formed in the door functional planar member 32, thus the door functional planar member 32 and the wiring member 40 are fixed to each other, however, the method of fixing the door functional planar member 32 and the wiring member 40 is not limited thereto.

Figure 7:
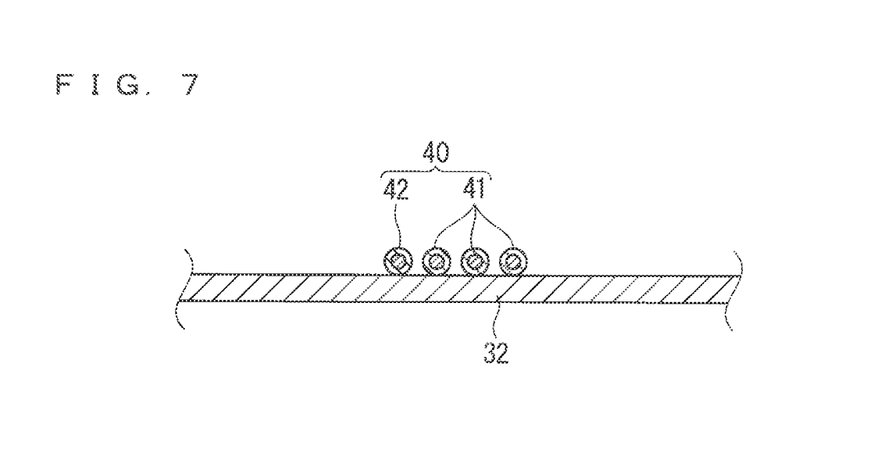
FIG. 7 is a cross-sectional view illustrating a first modification example of the door wiring module.

FIG. 7 is a cross-sectional view illustrating a first modification example of the door wiring module 30.

In the example illustrated in FIG. 7, the door functional planar member 32 and the electrical wires 41 and 42 are fixed by the contact area direct fixation in the manner similar to the fixation of the exterior members 50, 51, and 52 and the electrical wires 41 and 42. In this case, it is sufficient that a surface layer of the door functional planar member 32 and a surface layer of the covering of the electrical wires 41 and 42 are formed by a material which can be fixed by the contact area direct fixation such as a same type of resin material. In this case, bath the door functional planar member 32 and the covering of the electrical wires 41 and 42 may be a made up of a single layer. It is also applicable that a fusion layer for the contact area direct fixation is provided on at least one of the door functional planar member 32 and the covering of the electrical wires 41 and 42. In this case, it is applicable that a fusion layer is provided on the door functional planar member 32, thus the door functional planar member 32 is made up of two or more layers, or a fusion layer is provided on the covering of the electrical wires 41 and 42, thus the covering of the electrical wires 41 and 42 is made up of two or more layers.

The contact area indirect fixation or the non-contact area fixation described in the fixation of the exterior members 50, 51, and 52 and the electrical wires 41 and 42 may be applied to the fixation of the door functional planar member 32 and the electrical wires 41 and 42.

Figure 8:
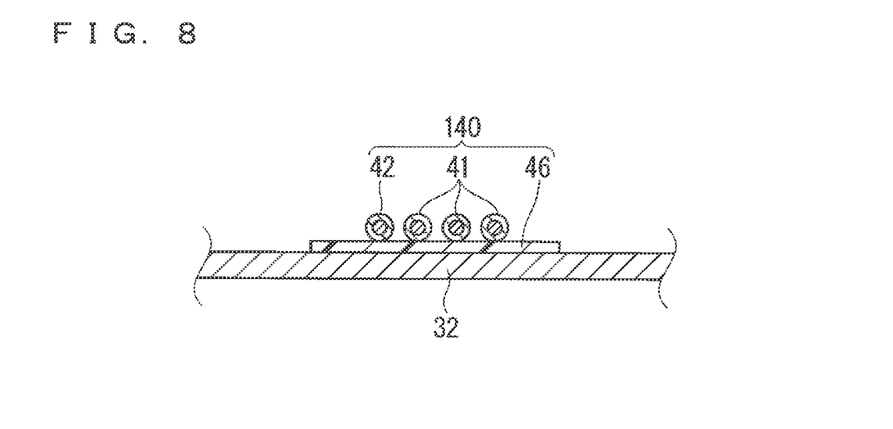
FIG. 8 is a cross-sectional view illustrating a second modification example of the door wiring module.
Figure 9:
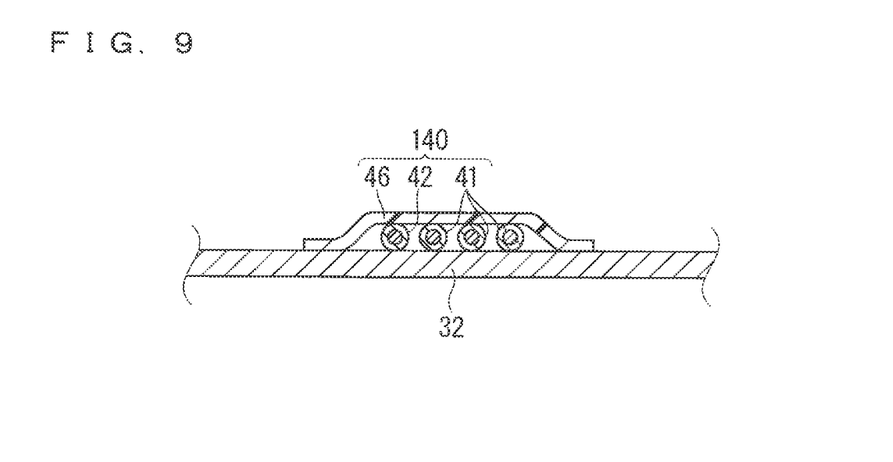
FIG. 9 is a cross-sectional view illustrating a third modification example of the door wiring module.

FIG. 8 is a cross-sectional view illustrating a second modification example of the door wiring module 30. FIG. 9 is a cross-sectional view illustrating a third modification example of the door wiring module 30.

In the examples illustrated in FIG. 8 and FIG. 9, a wiring member 140 includes a sheet member 46 holding the plurality of electrical wires 41 and 42 in a parallel state. The fixation of the sheet member 46 and the electrical wires 41 and 42 is not particularly limited, however, the contact area fixation or the non-contact area fixation described in the fixation of the exterior members 50, 51, and 52 and the electrical wires 41 and 42, for example, can be applied. The sheet member 46 is fixed to the door functional planar member 32.

At this time, in the example illustrated in FIG. 8, a rear surface of the sheet member 46 (a surface on a side opposite to a surface to which the electrical wires 41 and 42 are fixed) is fixed to the door functional planar member 32. In the example illustrated in FIG. 9, a part of a front surface of the sheet member 46 on a lateral side of the electrical wires 41 and 42 (a surface to which the electrical wires 41 and 42 are fixed) is fixed to the door functional planar member 32.

The fixing state of the sheet member 46 and the door functional planar member 32 is not particularly limited, however, the contact area fixation or the non-contact area fixation described in the fixation of the exterior members 50, 51, and 52 and the electrical wires 41 and 42, for example, can be applied.

The sheet member 46 may be formed to be integral with the exterior members 50, 51, and 52. That is to say, in the wiring member 140, the exterior members 50, 51, and 52 may extend to be provided also in a part wired on the door functional planar member 32. In this case, the exterior members 50, 51, and 52 are linked to the door functional planar member 32, thus it is sufficient that the exterior members 50, 51, and 52 are flexible sheet members which can be bended easily. It is obvious that the sheet member 46 may be provided separately from the exterior members 50, 51, and 52. In this case, the sheet member 46 may be the same type of sheet member as the exterior members 50, 51, and 52, or may also be a different type of sheet member.

Figure 10:
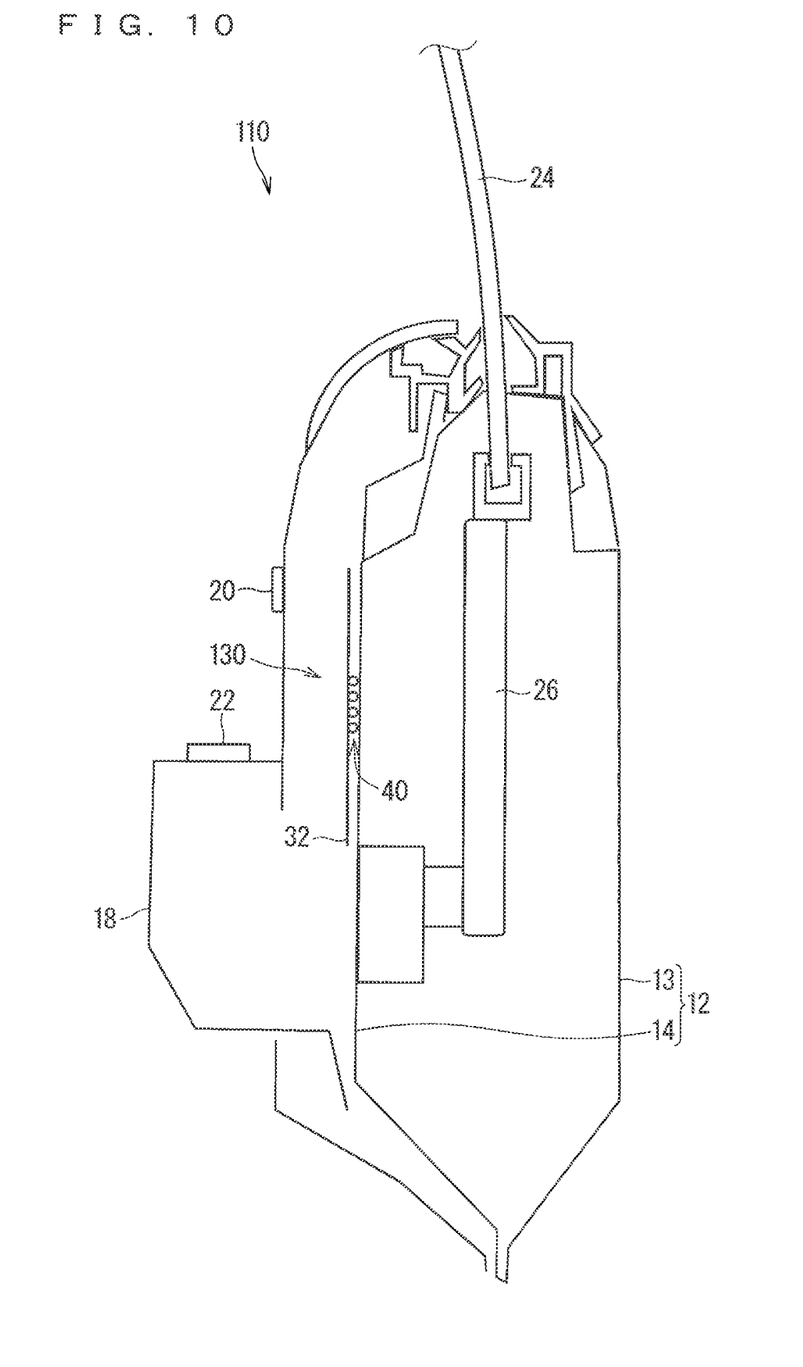
FIG. 10 is a cross-sectional view illustrating a fourth modification example of the door wiring module.

FIG. 10 is a cross-sectional view illustrating a fourth modification example of the door wiring module 30.

In the above description, the wiring member 40 is provided on the door functional planar member 32 on the inner side of the vehicle, however, this configuration is not necessary. As illustrated in FIG. 10, the wiring member 40 may be provided on the door functional planar member 32 on the outer side of the vehicle in a door wiring module 130 and a door 110 into which the door wiring module 130 is incorporated.

The wiring state of the wiring member 40 in the door wiring module 30 described in the embodiment is for exemplification, thus the wiring state of the wiring member 40 in the door wiring module 30 is not limited thereto described above. For example, the end portion of the wiring member 40 may be located on the door functional planar member 32. For example, the wiring member 40 may include a third electrical wire branching off from the first electrical wire 41 and the second electrical wire 42 in the same position as or a position different from branch positions of the first electrical wire 41 and the second electrical wire 42. When the wiring member 40 includes a plurality of parts extending to the outer side from the door functional planar member 32, a part thereof needs not be wired on the exterior members 50, 51, and 52.

In the above description, the door functional planar member 32 is a member having rigidity to be hardly bended in the front-back direction, however, this configuration is not necessary. The door functional planar member 32 may also be a member having rigidity to be beaded easily in the front-back direction.

In the above description, the door functional planar member 32 is the member covering the opening 15 of the inner panel 14, however, this configuration is not necessary. The door functional planar member may be a waterproof film or a soundproof material as long as it is incorporated between the door panel 12 and the design trim 18.

The waterproof film is a member formed into a sheet-like shape with an inner portion evenly filled With resin as a material, for example. The waterproof film is a member having a layer which does not pass water, and suppresses water intrusion from outside. The waterproof film needs not be made up of only a layer which does not pass water, however, a layer which passes water may be stacked on the waterproof film. For example, the waterproof film may have a configuration that waterproof processing is performed on a base material which passes water and a waterproof layer is formed on a surface thereof.

The soundproof member is a member for reducing sound. The soundproof member may be made up of an acoustic material, or may also be made up of a sound insulating material. The acoustic material has a space when seeing a cross section in a thickness direction. The acoustic material absorbs sound energy which has entered, for example, thereby reducing a reflection of sound as much as possible. A material having a larger number of small spaces therein such as a foam resin (urethane foam) and a non-woven sheet, for example, can be used as the acoustic material. The sound insulating material does not have a space when seeing a cross section in a thickness direction. The sound insulating material absorbs or reflects the sound energy, thereby cutting sound as much as possible, for example. A material which does not have a space therein such as a resin sheet with an inner portion evenly filled, for example, can be used as the sound insulating material. Any of the acoustic material and the sound insulating material may be used as the soundproof member. The soundproof member may double as the function as the acoustic material and the function of the sound insulating material.

In the above embodiment, the case where the wiring member 40 is the electrical wires 41 and 42 is described, however, the wiring member 40 may be a band-like wiring member made up of a plurality of linear conductors covered in a parallel state such as a flexible flat cable, for example. The wiring member is preferably a flat wiring member which is flatly formed.

In the part where the wiring member 40 is fixed to the door functional planar member 32 or the exterior members 50, 51, and 52, a soundproof member covering the wiring member 40 from a side opposite to the door functional planar member 32 and the exterior members 50, 51, and 52 may be provided. In this ease, the soundproof member can absorb abnormal noise emitted from the wiring member 40. A member having the function as the acoustic material, the sound insulating material, or both functions as described above can be used as the soundproof member.

Each configuration described in the embodiment and each modification example can be appropriately combined as long as they are not contradictory.

EXPLANATION OF REFERENCE SIGNS

10 door
12 door panel
13 outer panel
14 inner panel
15 opening
18 design trim
30 door wiring module
32 door functional planar member
34 groove
35 retaining part
40 wiring member
41 first electrical wire
42 second electrical wire
43, 44, 45 connector
46 sheet member
50, 51, 52 exterior member

The invention claimed is:

1. A door wiring module, comprising:
a door functional planar member incorporated between a door panel and a design trim in a door of a vehicle;
a wiring member wired on and held by the door functional planar member; and
an exterior member in which a part of the wiring member extending to an outer side from the door functional planar member and incorporated into the door is wired and held, wherein
the wiring member includes a plurality of covering wires wired side by side on a main surface of the door functional planar member and a main surface of an exterior member,
the exterior member is a sheet member which fixes the plurality of covering wires by a contact area direct fixation to hold the plurality of covering wires to be located side by side,
the door wiring module is provided to be able to be folded so that the exterior member overlaps with the door functional planar member before being incorporated into the door,
the door wiring module is incorporated into the door in a state where the exterior member is developed, and
the sheet member has flexibility to be bended in a front-back direction, and the door functional planar member has rigidity to be hardly bended in a front-back direction.

2. The door wiring module according to claim 1, wherein
the door functional planar member and the exterior member are provided at intervals in an extension direction of the wiring member, and
the wiring member is bended between the door functional planar member and the exterior member, thus the door wiring module can be bended so that the exterior member overlaps with the door functional planar member.

* * * * *